(12) United States Patent
Naqvi et al.

(10) Patent No.: US 6,545,992 B2
(45) Date of Patent: Apr. 8, 2003

(54) SYSTEM AND METHOD OF SELECTING GGSN IN A MOBILE COMMUNICATIONS NETWORK

(75) Inventors: Shamim A. Naqvi, Boston, MA (US); Murali Aravamudan, Windham, NH (US); Rangamani Sundar, Windham, NH (US); Kumar K. Vishwanathan, Windham, NH (US)

(73) Assignee: Winphoria Networks, Inc., Tewksbury, MA (US)

( * ) Notice: Subject to any disclaimer, the term of this patent is extended or adjusted under 35 U.S.C. 154(b) by 0 days.

(21) Appl. No.: 09/845,703

(22) Filed: Apr. 30, 2001

(65) Prior Publication Data

US 2002/0159420 A1 Oct. 31, 2002

(51) Int. Cl.[7] .......................... H04Q 7/24; H04B 7/216
(52) U.S. Cl. ........................................ 370/335; 370/342
(58) Field of Search ................................ 370/235, 236, 370/237, 328, 331, 335, 338; 455/417, 432, 433, 445, 452

(56) References Cited

U.S. PATENT DOCUMENTS

| 6,104,929 | A  | * | 8/2000  | Josse et al. ............... 370/379 |
| 6,185,227 | B1 | * | 2/2001  | Sipola ......................... 370/522 |
| 6,230,005 | B1 | * | 5/2001  | Le et al. ..................... 455/414 |
| 6,233,458 | B1 | * | 5/2001  | Haumont et al. ........... 455/417 |
| 6,256,498 | B1 | * | 7/2001  | Ludwig ....................... 455/433 |
| 6,466,566 | B1 | * | 10/2002 | Boudreaux .................. 370/331 |

OTHER PUBLICATIONS

Performance and architecture of SGSN and GGSN of general packet radio service (GPRS), Mishra, A., Global Telecommunications Conference, 2001. Globecom 2001. IEEE, vol. 6, 2001 pp. 3494–3498.*

* cited by examiner

Primary Examiner—Hassan Kizou
Assistant Examiner—David Odland
(74) Attorney, Agent, or Firm—Hale and Dorr LLP

(57) ABSTRACT

A method and system of determining a GGSN to serve data calls in a mobile communications network is provided. Messages are received from a SGSN, and analyzed to determine if the message is requesting the identity of a GGSN. If the received message is requesting the identity of a GGSN, a GGSN selection algorithm is executed to identify a GGSN to serve data calls from a specified MS. A reply is then constructed and sent to the SGSN identifying the selected GGSN.

14 Claims, 5 Drawing Sheets

SYSTEM AND METHOD OF SELECTING GGSN IN A MOBILE COMMUNICATIONS NETWORK

BACKGROUND OF THE INVENTION

1. Field of the Invention

This invention relates to mobile communications and, more particularly, to the selection of a GGSN to aggregate data calls in a mobile communication network.

2. Discussion of Related Art

Current digital wireless or mobile communication networks are predominantly second generation ("2G") networks. The dominant protocols are TDMA, GSM, and CDMA. These networks have limited capability in servicing data (as opposed to voice) calls. Typical bandwidth is about 9.6 Kbits/second.

Third generation ("3G") networks have been proposed. CDMA2000 and UMTS are two of the more popular proposed 3G networks. These proposals are intended to serve more voice users on a given network and to support higher data rates (e.g., greater than 144 Kbits/second) to a mobile station, such as a "cell phone."

FIG. 1 shows an exemplary arrangement of a UMTS network 100. A geographical "coverage area" is partitioned into a number of smaller geographical areas called "cells" (not shown.) Mobile stations (MSs) 101 powered on in the coverage area communicate via a radio channel to a corresponding node 102. A plurality of nodes 102a–n communicate via links 103a–n with a corresponding Radio Network Controller (RNC) 104. The RNC 104 aggregates the communication traffic from the nodes and provides functionality, such as detecting the service options activated by the MS 101. The combination of nodes 102 and RNC 104 is called a Universal Terrestrial Radio Access Network (UTRAN) 105. There are potentially many UTRANs in a network.

Each UTRAN 105 communicates with a call server 108 (also called a MSC server or a session control manager) via signaling links 106 and bearer trunks 107 and communicates with a SGSN 111 via IP link 110. The traffic between the UTRAN and the call server, i.e., voice calls, may be ATM-based, and the interface is defined by the Iu-cs interface. The call server has control logic for managing the voice calls and a bearer plane for switching the incoming voice traffic.

The traffic between a UTRAN and an SGSN is packet-based. The ingress to the SGSN are GTP (GPRS Tunneling Protocol) tunnels, and the SGSN switches these tunnels based on instructions from the control logic in the call server. These instructions are contained in IP packets and sent from the SGSN to the call server via link 120 to the IP network 118, from which the call server receives them. Analogously, the UTRAN may communicate IP traffic to the call server via the SGSN and IP network 118, 120. The traffic in the GTP tunnels may be data traffic, e.g., traffic to a web site, or it may be packetized voice in which case the control logic would be required to give special management to such traffic, e.g., QoS considerations. (SGSN is the industry acronym for "Serving GPRS Support Node".) A call server 108 and an SGSN 111 may each handle a (potentially different) plurality of UTRANs 105a–n.

The call server 108 is responsible for handling circuit based voice calls if the Iu-CS interface is implemented. The UTRAN 105 is responsible for detecting the activation of such calls and, in response to such activation, cooperates with the call server to establish the necessary signaling links 106 and bearer circuits 107 to the call server 108. The call server, in addition to cooperating with the UTRAN, establishes corresponding signaling links 112 and bearer circuits 114 to the voice network. More specifically, the call server establishes signaling links with the SS7 signaling network 113 and bearer circuits with the PSTN bearer circuit network 115. Voice calls may thus be routed to a called party using conventional signaling and switching and using circuit based techniques.

A SGSN 111 is responsible for handling data calls—both conventional data calls such as Internet requests and voice calls over the data network. The UTRAN 105 is responsible for detecting the activation of such calls and, in response to such activation, cooperates with the SGSN 111 to establish the necessary data paths via IP link 109 to the SGSN 111. The SGSN then helps establish a GTP tunnel starting from the UTRAN and extending to a GGSN 119 to set up a virtual private network, or "VPN." The control logic for this switching behavior can reside in the call server. (GGSN is the industry acronym for "Gateway GPRS Supporting Node".) The SGSN then processes the received information and forms it into IP packets that may be carried on the tunnel in the private IP network 118. The GGSN receives IP packets from potentially many SGSNs 111j–l and aggregates such traffic in addition to providing other services, such as security. The aggregated IP traffic may then be communicated on to a public IP network 120 such as the Internet 121.

Mobility management needs to be performed for both voice and data calls. For circuit-switched voice calls, the call server 108 is responsible for managing mobile terminals. Control logic in the call server accesses a Visiting Location Register (VLR) 116 typically co-located with the call server to carry out this function. The VLR holds subscriber information that is typically a subset of the information stored in the Home Location Register (HLR) 117. The HLR is updated to handle mobility management for both voice and data calls. As a subscriber roams while making a circuit-switched voice call, circuit connections to the appropriate UTRAN from the call server have to be maintained. For data calls (including packetized voice calls) the call server is also responsible for mobility management. In this case the GTP tunnel from the appropriate SGSN to the appropriate UTRAN needs to be maintained as the subscriber roams in the network. Mobility management in the case of data calls involves the selection and maintenance of such tunnels. The logic to carry out this function resides in the call server and accesses the HLR and VLR to perform this function.

When a MS 101 makes a data call (i.e., when it initiates a packet session), the UTRAN 105 receives signaling information, detects that a data call is forthcoming and begins to receive packets from the MS 101. Upon detecting that a data call is forthcoming, agent software executing in the call server mobility management module access the HLR 117 using the subscriber ID of the MS, the MS number (MSN), the terminal identification code, or the like, as a key to obtain certain subscriber profile information including the "home" GGSN for that subscriber. As the data call continues, the SSGN which receives the data packets from the UTRAN sends the data packets over IP network 118 to the home GGSN which aggregates the packets for subsequent transmission to the public IP network 121, 122.

The inventors believe that static assignment of a GGSNs causes certain inefficiencies and disadvantages. For example, if a user is roaming, the GGSN at the end of the tunnel may be far away from the user. Not only is this inefficient use of the network (as the IP packets may have to encounter many hops in the network) but performance will suffer. This performance disadvantage may make the approach less suitable for using the data side of the network for voice over IP calls and for certain multimedia traffic.

SUMMARY

In accordance with the present invention, a method and system of determining a GGSN to serve data calls in a mobile communications network is provided. Messages are received from the control logic in the call server, and analyzed to determine if the message is requesting the identity of a GGSN. If the received message is requesting the identity of a GGSN, a GGSN selection algorithm is executed to identify a GGSN to serve data calls from a specified MS. A reply is then constructed and sent to the SGSN identifying the selected GGSN.

According to one aspect of the invention, the GGSN that is closest to the SGSN is selected. According to another aspect of the invention a GGSN that has the capacity to serve data calls from the specified MS is selected. According to yet another aspect of the invention a GGSN is selected in consideration of the operational status of network segments connecting a GGSN to the network.

According to yet another aspect of the invention, IP packet reception logic receives messages from the control logic of a call server, and IP packet analysis logic determines if the received message is requesting the identity of a GGSN. GGSN selection logic, which is responsive to the IP packet analysis logic, identifies a GGSN to serve data calls from a specified MS, and IP packet reply logic constructs and sends a reply packet to the SGSN identifying the selected GGSN.

According to yet another aspect of the invention, the logic is software logic executing on a switch platform in communication with an HLR and with an IP network. According to yet another aspect of the invention, the logic is software logic executing on the HLR. According to yet another aspect of the invention, the logic is software logic executing on an adjunct that cooperates with the HLR.

Under yet another embodiment of the invention, GGSN selection logic is batch-like. GGSN selection algorithm is executed to identify a GGSN to serve data calls from the SGSN, and the identified GGSN is provided to an HLR to associate the identified GGSN with the SGSN.

DETAILED DESCRIPTION

Preferred embodiments of the invention provide new systems and methods for determining and identifying a GGSN to serve a data call within a mobile communications network. More specifically, preferred embodiments of the invention select a serving GGSN based on a variety of criteria, rather than merely use the home GGSN in all cases. Selection may be based on (among other things) the geographical proximity of a GGSN, available capacity of a GGSN, capacity of network segments connecting a GGSN, and the operational status of GGSNs or links to GGSNs. Additionally, the service provider may establish policies for selecting a GGSN which, in turn, may be included within the GGSN selection logic. Though several preferred embodiments dynamically select GGSNs (in near real-time), certain embodiments make selection based on batch-type selection as part of network management.

Figure 1:
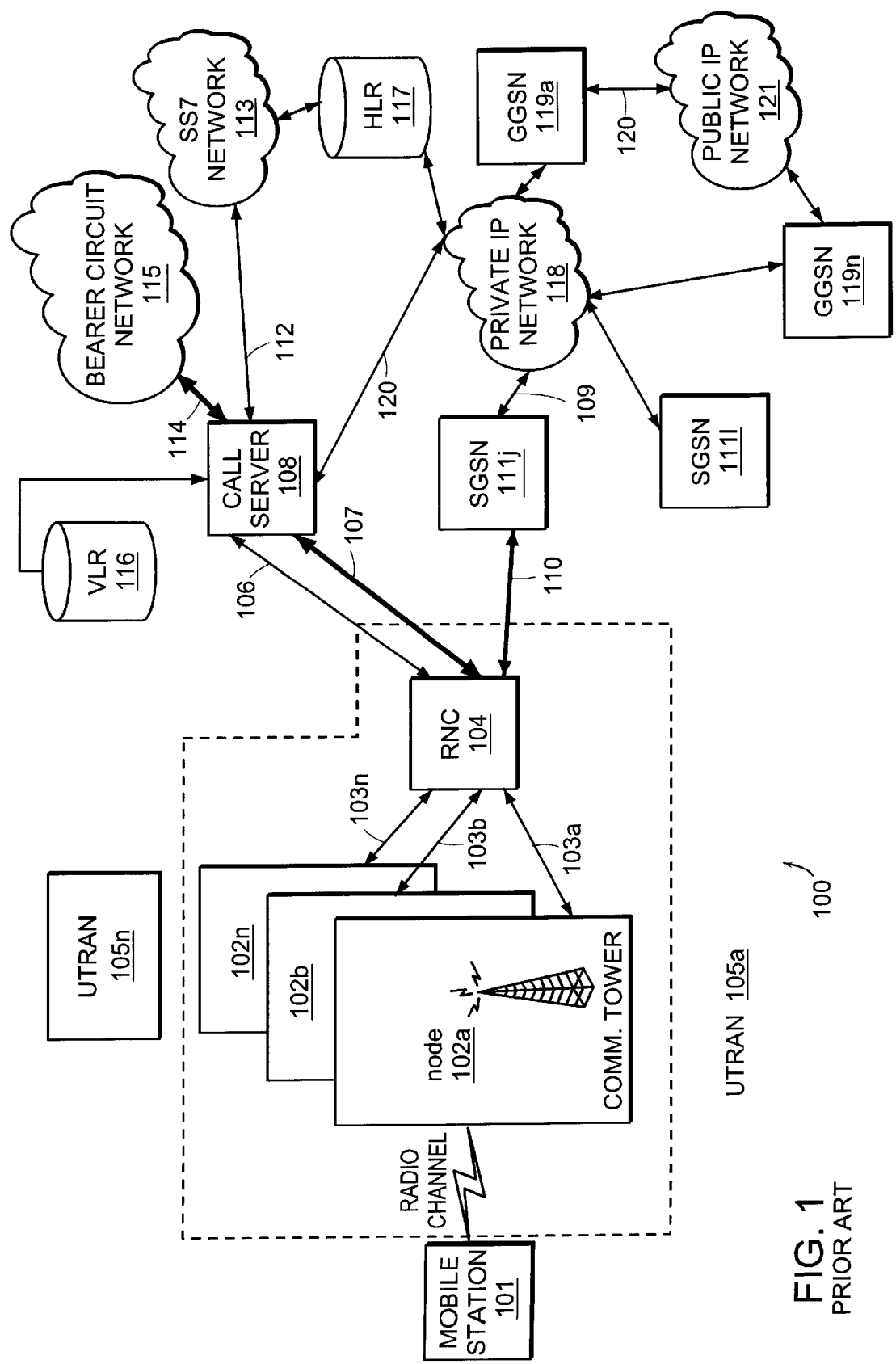
FIG. 1 is a system diagram of an illustrative 3G mobile network.
Figure 2:
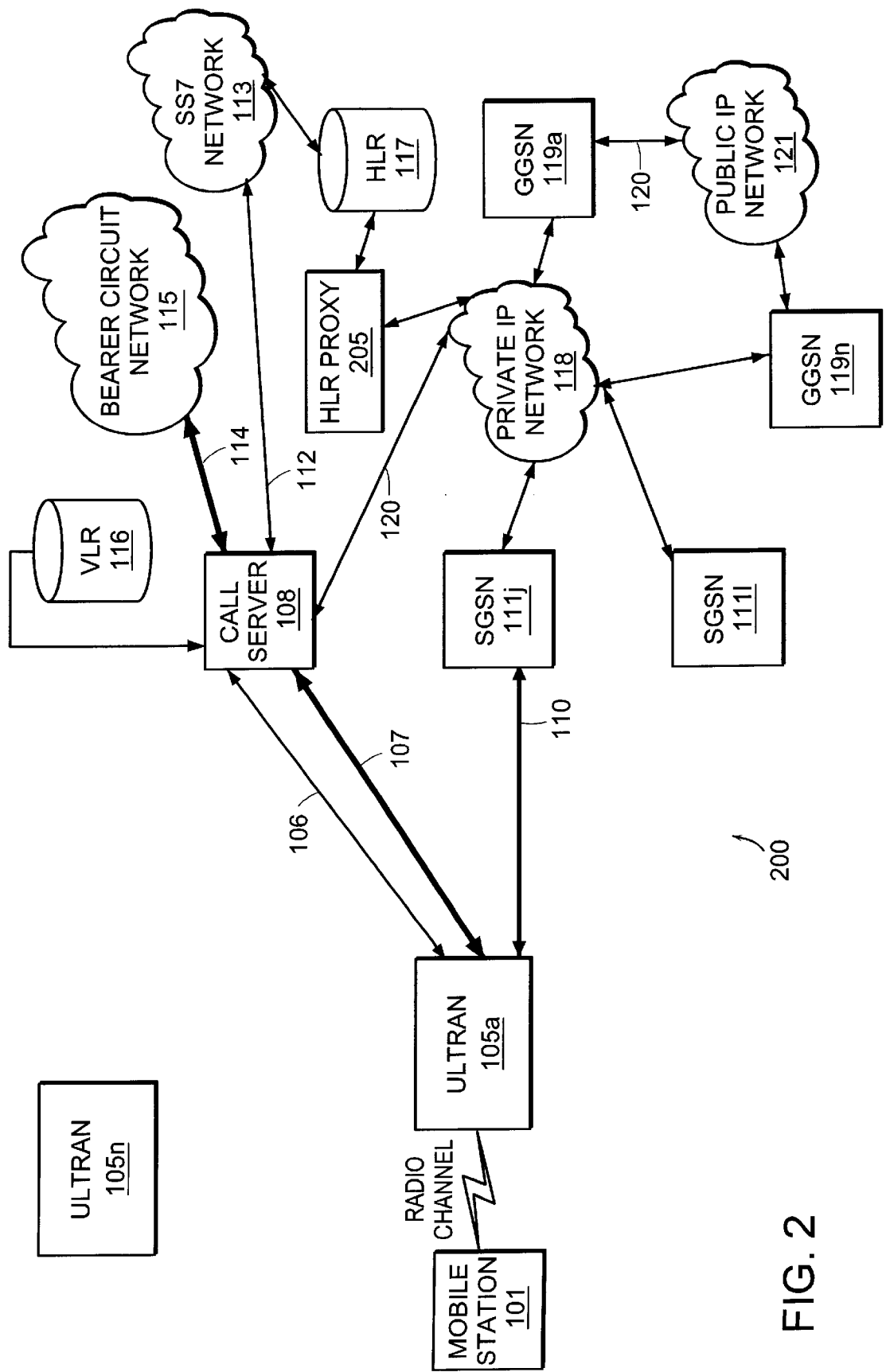
FIG. 2 is a system diagram of an illustrative 3G mobile networks according to one embodiment of the invention.

FIG. 2 shows an exemplary wireless network 200 according to a preferred embodiment of the invention. Like numerals are used to explain the same or similar components as those in FIG. 1 but the description is not repeated for the sake of brevity. The system 200 differs from FIG. 1 by the inclusion of a HLR proxy switch 205 positioned between and communicating with the private IP network 118 and the HLR 117. (Persons skilled in the art will appreciate that though HLR 117 is a logical singular database its physical realization is a distributed database having many instances.)

Under preferred embodiments, HLR proxy 205 is implemented by using the proxy switch described in co-pending U.S. patent application Ser. No., 09/721,329, filed Nov. 22, 2000, (assigned to the assignee of the instant invention) which is hereby incorporated by reference in its entirety. More specifically, the proxy switch described in the co-pending application is modified to communicate according to the IP protocol and with IP links and to include GGSN selection logic discussed herein.

As described in the co-pending application, the proxy switch accepts all signaling messages and may be configured to do one or more of several specified actions depending on the received signaling message and on the state of the session and system. That behavior is used in certain embodiments of the present invention, except that the signaling information is conveyed as IP packets instead of via SS7 signaling or the like.

Under certain embodiments, the HLR proxy switch 205 performs one or more of the following in response to IP packets received from private IP network 118:

1. HLR proxy 205 passes the message unaltered to the HLR or the SGSN; or
2. HLR proxy 205 intercepts the messages, does not pass it on, and instead handles the message, including, for example, by generating a response to the message.

The types of actions performed in each case along with the triggering events are described below. As will be described below, the HLR proxy 205 may be implemented by using the proxy switch's ability to intercept pre-specified messages while allowing all others to pass through unaltered. The proxy switch is modified to handle the 3G or other signaling protocols used and to generate responses to intercepted messages as described below.

Figure 3:
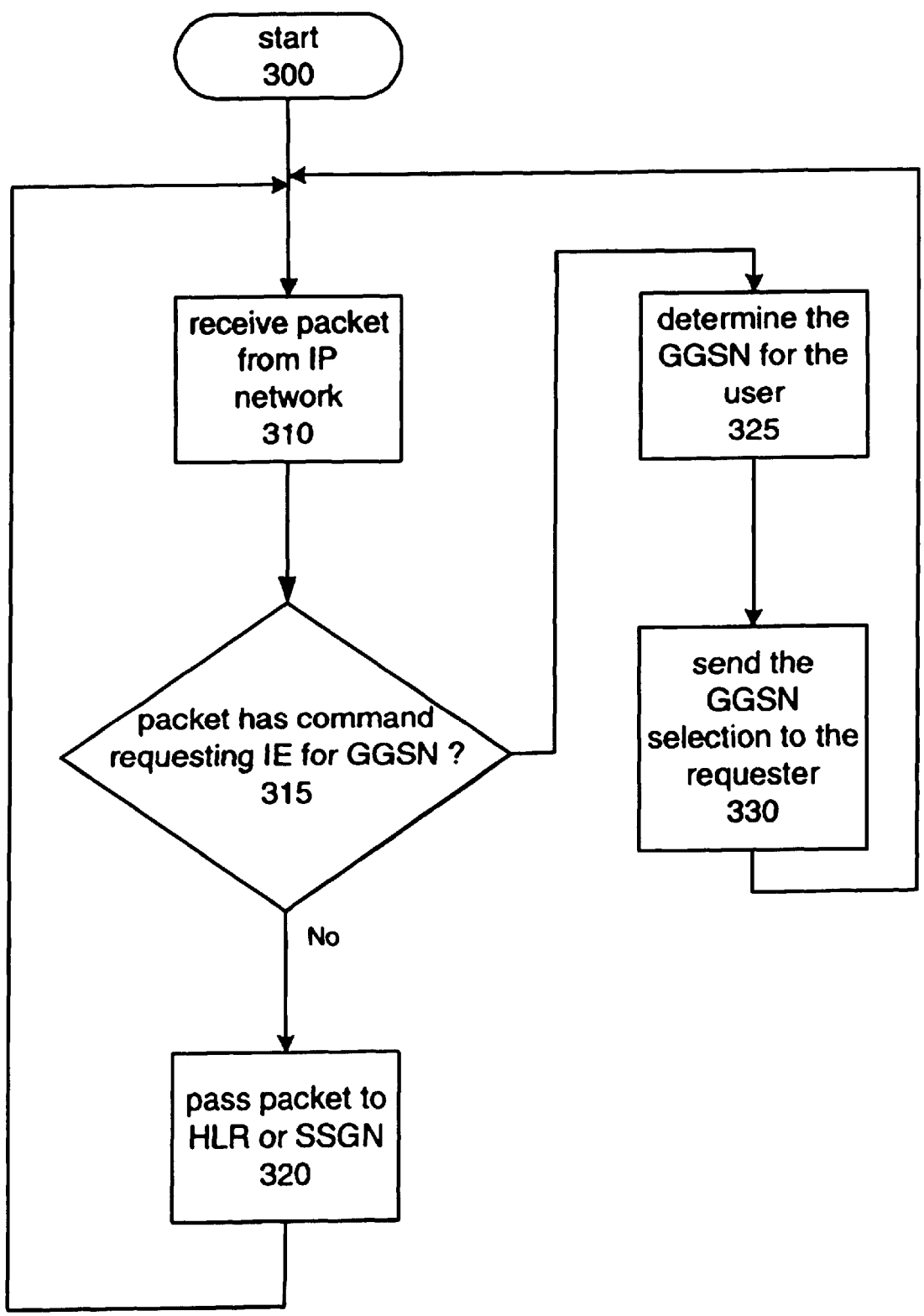
FIG. 3 shows GGSN selection logic according to one embodiment of the invention.

FIG. 3 is a flow chart illustrating GGSN selection logic of a preferred embodiment. The logic starts at 300 and proceeds to receive 310 IP packets from the network, e.g., from the call server 108 and addressed to the HLR 117. Each packet is monitored 315 to see if the packet is a command requesting an information element (IE) corresponding to the GGSN for a given user. (Such requests, as outlined above, are initiated by the call server 108 and sent to the HLR 117 to determine which GGSN should aggregate IP traffic for a given user. As outlined above, ordinarily the request is received by the HLR 117 which then replies with the user's home GGSN.) The specific IE used is determined based on the network standard as provisioned by the specific service provider.

If the packet does not contain such a command, the logic proceeds to forward 320 the packet unaltered, e.g., to the HLR 117. The HLR then handles the packet accordingly. If as part of handling the packet the HLR 117 sends a reply packet, the HLR proxy 205 processes it like the above. Specifically, the HLR proxy 205 will receive 310, monitor 315, and pass 320 the reply packet unaltered (replies from the HLR by definition do not have commands requesting an IE having the GGSN). In this fashion, the reply is sent to the requester, e.g., the SSGN 111.

If the packet does contain a command requesting the IE having the GGSN, the logic selects 325 a GGSN based on a predefined algorithm (more below). The selected GGSN is then encapsulated in a reply packet and sent 330 to the requester, i.e., SSGN 111. The original IP packet is never sent to the HLR.

Once the SSGN 111 receives the request packet identifying the GGSN to use, the SSGN establishes a GTP tunnel to the selected GGSN as outlined above, except that in this instance the GGSN is not the "home" GGSN but instead is one selected dynamically. The selected GGSN will then aggregate IP packets originating from, or destined to the user, via this GGSN.

As stated above, the predefined algorithm for selecting a GGSN may be of many forms. One embodiment selects the GGSN that is geographically closest to the MS and SSGN. In this case, the HLR proxy 205 as part of determining 325 a GGSN consults a network topology database (not shown) and queries it to find the GGSN closest to the SSGN that originated the request. Closest, for example, may be inferred from the fewest number of network hops between the SSGN and the GGSN.

Under an alternative algorithm, performance criteria and/or conditions are analyzed to select a GGSN. For example, the GGSN selection logic may query a management database or utility to identify IP network segments that are underloaded and may then select a GGSN from such a segment. This approach may be used in conjunction with the above or as a substitute to the above.

Alternatively, the algorithm may select a GGSN based on reliability information, such as avoiding GGSNs experiencing a large number of fault conditions and instead selecting a "back-up" GGSN.

The actual algorithm may be selected from a set of such algorithms by an administrator. In this example, the HLR proxy 205 would include a network administrator interface (not shown) permitting the selection of an algorithm by a user or permitting the user to specify selection rules, e.g., select one algorithm during heavy demand hours and another algorithm at different times.

Figure 4:
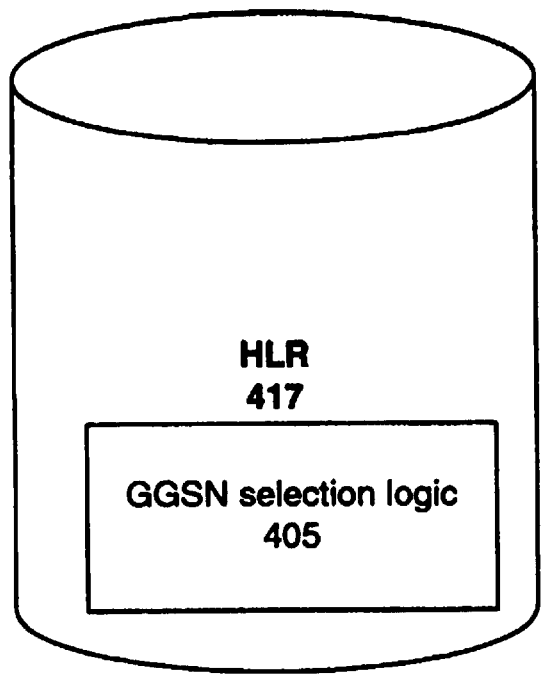
FIGS. 4–6 are architectural diagrams showing alternative embodiments of the invention.
Figure 5:
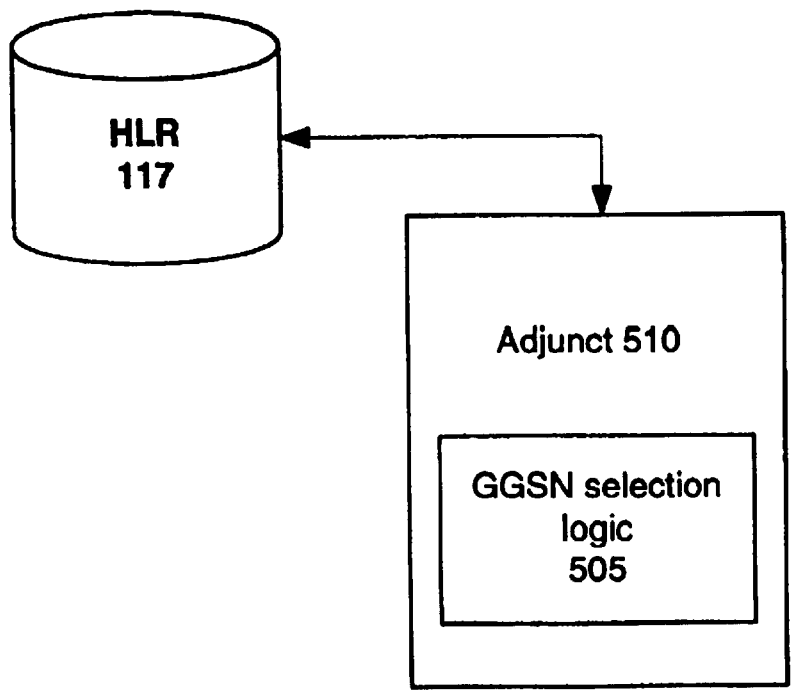
Figure 6:
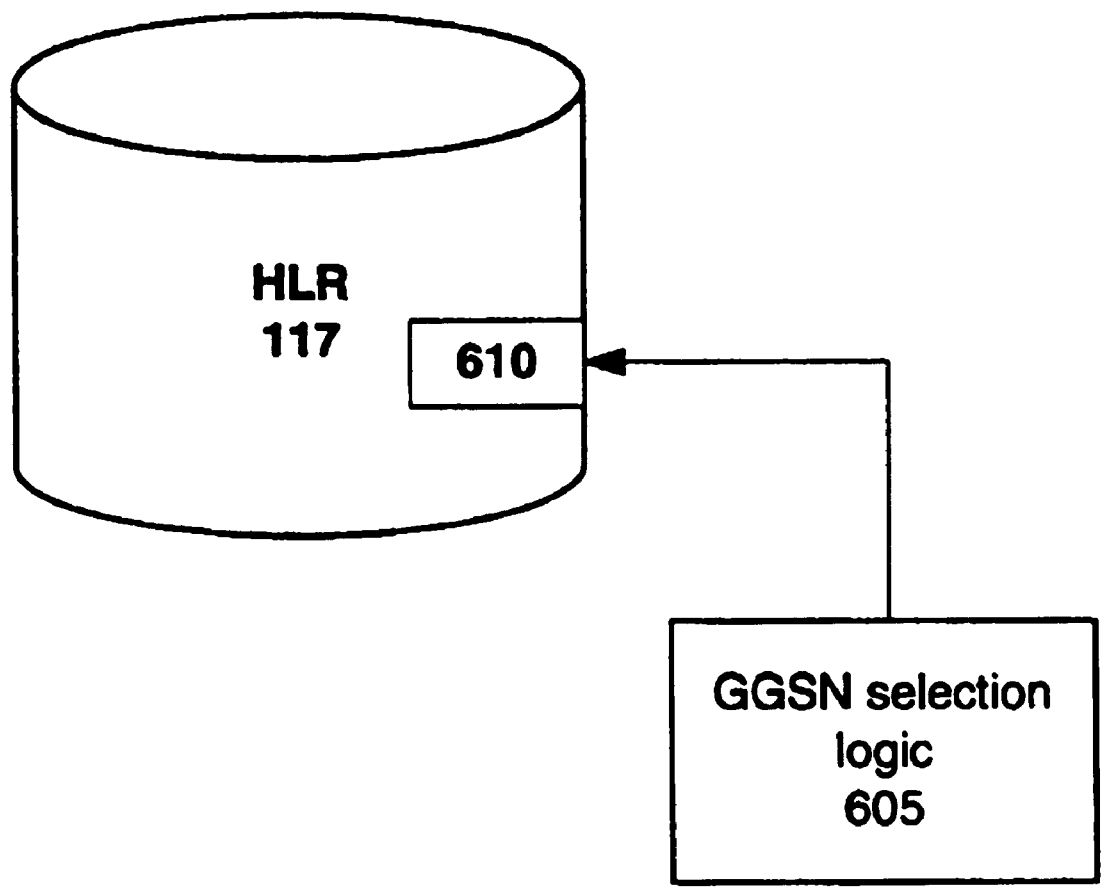

Though the above description was in relation to a HLR proxy 205, other embodiments of the invention may place GGSN selection logic at other places in the network. For example, FIG. 4 shows an embodiment in which GGSN selection logic 405 (e.g., as discussed herein) is included within the HLR 417. FIG. 5 shows an embodiment in which the selection logic 505 is executed on an adjunct 510 that cooperates with the HLR 117. FIG. 6 shows another embodiment in which the GGSN selection logic 605 is run periodically as a batch-like job as part of network management utility. GGSNs may be selected for association with MSs based on network performance and reliability information. The logic 605 may then access the HLRs via a data interface 610 and specify the GGSNs:accordingly. This access and update would operate analogously to programming home GGSNs into the HLR, but in this instance the GGSN would be based on other criteria.

Variations

Currently, there are some proposals to provide HSSs—Home Subscriber Servers. The HSS will serve both PSTN and IP entities for their subscriber profile and data needs. The HSS may also be used as a mobile transaction server allowing subscribers to purchase items in which case billing will be tied to the HSS.

In such cases, the selection of GGSN may be tied to mobile commerce considerations, e.g., if a subscriber purchases an item the network may switch him or her to a more secure IP session with some other GGSN.

Having described an exemplary embodiment, it should be apparent to persons of ordinary skill in the art that changes may be made to the embodiment described without departing from the spirit and scope of the invention.

What is claimed is:

1. A method of determining a GGSN to serve data calls in a mobile communications network having at least two GGSN's and a SGSN in a network, comprising the acts of:
   receiving messages from a SGSN;
   analyzing the received message to determine if it is requesting the identity of a GGSN;
   if the received message is requesting the identity of a GGSN, executing a GGSN selection algorithm to identify a GGSN to serve data calls from a specified MS;
   constructing and sending a reply to the SGSN identifying the selected GGSN.

2. The method of claim 1 wherein the act of executing a GGSN selection algorithm includes the act of determining a GGSN that is closest to the SGSN.

3. The method of claim 1 wherein the act of executing a GGSN selection algorithm includes the act of determining a GGSN that has the capacity to serve data calls from the specified MS.

4. The method of claim 1 wherein the act of executing a GGSN selection algorithm includes the act of considering the operational status of network segments connecting a GGSN to the network.

5. A system for determining a GGSN to serve data calls in a mobile communications network having at least two GGSNs and a SGSN in a network, comprising:
   IP packet reception logic to receive messages from a SGSN;
   IP packet analysis logic to determine if the received message is requesting the identity of a GGSN;
   GGSN selection logic, responsive to the IP packet analysis logic, to identify a GGSN to serve data calls from a specified MS;
   IP packet reply logic to construct and send a reply packet to the SGSN identifying the selected GGSN.

6. The system of claim 5 wherein the network includes a HLR and wherein the IP packet reception logic, IP packet analysis logic, GGSN selection logic, and IP packet reply logic is software logic executing on a switch platform in communication with the HLR and with an IP network.

7. The system of claim 5 wherein the network includes a HLR and wherein the IP packet reception logic, IP packet analysis logic, GGSN selection logic, and IP packet reply logic is software logic executing on the HLR.

8. The system of claim 5 wherein the network includes a HLR and wherein the IP packet reception logic, IP packet analysis logic, GGSN selection logic, and IP packet reply logic is software logic executing on an adjunct that cooperates with the HLR.

9. A method of determining a GGSN to serve data calls in a mobile communications network having at least two GGSNs and a SGSN in a network, comprising the acts of:

executing a GGSN selection algorithm to identify a GGSN to serve data calls from the SGSN;

providing the identified GGSN to an HLR to associate the identified GGSN with the SGSN.

10. The method of claim 2 wherein the act of determining a GGSN that is closest determines the GGSN in nearest geographic proximity to the specified MS.

11. The method of claim 2 wherein the act of determining a GGSN that is closest determines the GGSN with fewest network hops from the SGSN from which the message was received.

12. The method of claim 1 wherein executing the GGSN selection algorithm identifies a GGSN having utilization under a specified threshold.

13. The method of claim 1 wherein executing the GGSN selection algorithm identifies a GGSN based on predetermined performance criteria.

14. The method of claim 1 wherein executing the GGSN selection algorithm identifies a GGSN that has relatively less associated packet delay.

* * * * *